(12) United States Patent
Reichmuth

(10) Patent No.: US 11,130,121 B2
(45) Date of Patent: Sep. 28, 2021

(54) MULTICHANNEL SYRINGE FOR USE WITH A METERING DEVICE

(71) Applicant: Eppendorf AG, Hamburg (DE)

(72) Inventor: Burkhardt Reichmuth, Hamburg (DE)

(73) Assignee: Eppendorf AG, Hamburg (DE)

( * ) Notice: Subject to any disclaimer, the term of this patent is extended or adjusted under 35 U.S.C. 154(b) by 263 days.

(21) Appl. No.: 16/309,045

(22) PCT Filed: Jun. 21, 2017

(86) PCT No.: PCT/EP2017/065277
§ 371 (c)(1),
(2) Date: Dec. 11, 2018

(87) PCT Pub. No.: WO2017/220673
PCT Pub. Date: Dec. 28, 2017

(65) Prior Publication Data
US 2020/0306746 A1    Oct. 1, 2020

(30) Foreign Application Priority Data
Jun. 21, 2016  (EP) .................................. 16175499

(51) Int. Cl.
*G01N 35/10* (2006.01)
*B01L 3/02* (2006.01)
*G01F 11/02* (2006.01)

(52) U.S. Cl.
CPC .......... *B01L 3/0217* (2013.01); *B01L 3/0275* (2013.01); *G01F 11/027* (2013.01); *G01N 35/1065* (2013.01)

(58) Field of Classification Search
CPC ........ B01L 3/0217; B01L 3/0275; B01L 3/02; G01F 11/027; G01N 35/1065
(Continued)

(56) References Cited

U.S. PATENT DOCUMENTS

| 4,335,621 A | * | 6/1982 | Tervamaki | ............ B01L 3/0234 222/391 |
| 4,406,170 A | | 9/1983 | Kuhn | |

(Continued)

FOREIGN PATENT DOCUMENTS

| DE | 102004003433 B4 | 3/2006 |
| EP | 0172508 A2 | 2/1986 |

(Continued)

*Primary Examiner* — Robert R Raevis
(74) *Attorney, Agent, or Firm* — Vidas, Arrett & Steinkraus PA; Edwin E. Voigt, II

(57) ABSTRACT

A multichannel syringe for use with a metering device having a barrel holding apparatus of a syringe barrel and an axially movable holding apparatus of a syringe plunger 5 comprising: a plunger unit having a drive rod comprising the plunger holding apparatus, a crossmember on the lower end of the drive rod, and a plurality of syringe plungers projecting downward and parallel to the drive rod, a barrel unit comprising a support and rows of syringe barrels arranged in a parallel 10 manner, protruding downwards from the support, and having lower and upper syringe openings, and a running region, wherein each syringe plunger engages a syringe barrel through, an upper syringe opening and is sealingly guided in the running region, and the barrel holding apparatus is above the syringe barrel and is connected to the support.

18 Claims, 13 Drawing Sheets

(58) Field of Classification Search
USPC .............. 73/863.32, 864.16, 864.17, 864.13, 73/864.18; 422/501, 502, 504, 521
See application file for complete search history.

(56) References Cited

U.S. PATENT DOCUMENTS

| | | | |
|---|---|---|---|
| 4,591,072 A | 5/1986 | Oshikubo | |
| 4,779,467 A * | 10/1988 | Rainin | B01L 3/0279 422/513 |
| 5,355,738 A * | 10/1994 | Heinonen | B01L 3/0279 422/932 |
| 5,620,660 A | 4/1997 | Belgardt et al. | |
| 5,620,661 A | 4/1997 | Schurbrock | |
| 5,970,806 A * | 10/1999 | Telimaa | B01L 3/0217 73/864.17 |
| 7,335,337 B1 * | 2/2008 | Smith | B01L 3/0275 422/513 |
| 8,201,466 B2 * | 6/2012 | Roussel | B01L 3/0217 73/863.32 |
| 8,813,584 B2 | 8/2014 | Blumentritt et al. | |
| 8,839,685 B2 * | 9/2014 | Lohn | A61M 5/31513 73/864.13 |
| 9,291,529 B2 | 3/2016 | Lohn | |
| 2002/0020233 A1 * | 2/2002 | Baba | B01L 3/0286 73/864.16 |
| 2016/0199830 A1 * | 7/2016 | LaCroix | B01L 3/0217 73/864.13 |

FOREIGN PATENT DOCUMENTS

| | | |
|---|---|---|
| EP | 0656229 B1 | 7/1997 |
| EP | 0657216 B1 | 5/1999 |
| EP | 1739434 B1 | 2/2014 |
| EP | 2279791 B1 | 11/2014 |
| EP | 2 574 402 B1 | 3/2015 |
| EP | 2190582 B1 | 2/2016 |
| EP | 2735369 B1 | 4/2017 |
| GB | 2 057 581 B | 10/1983 |
| JP | 8-117618 | 5/1996 |
| JP | 3389352 B2 | 3/2003 |

* cited by examiner

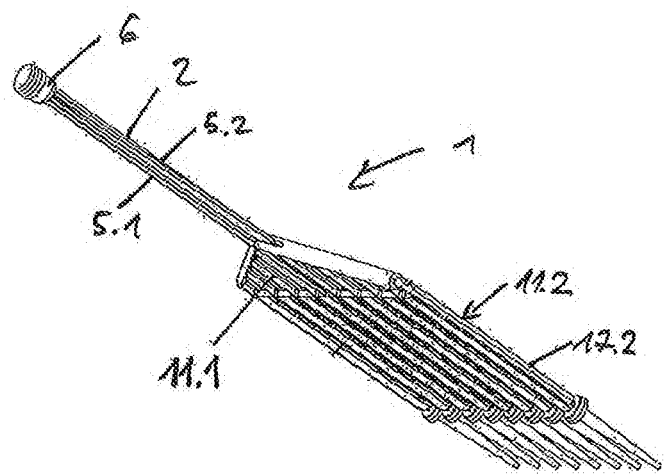
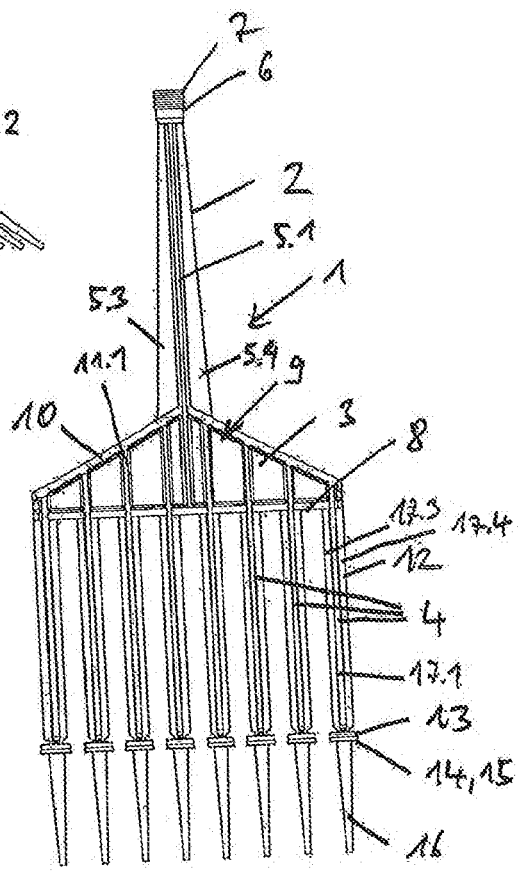
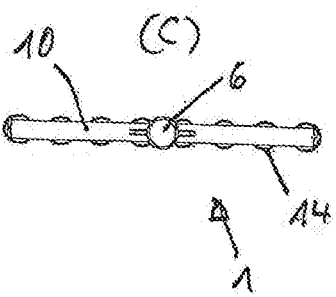
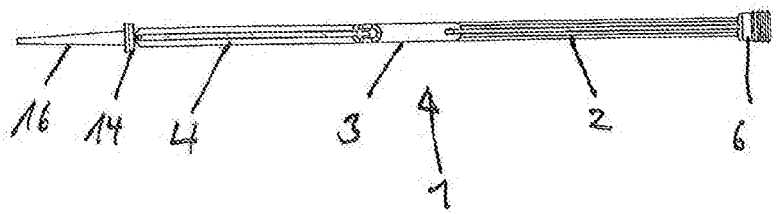
Fig. 1

Fig. 3
(a)
(b)
(c)
(d)
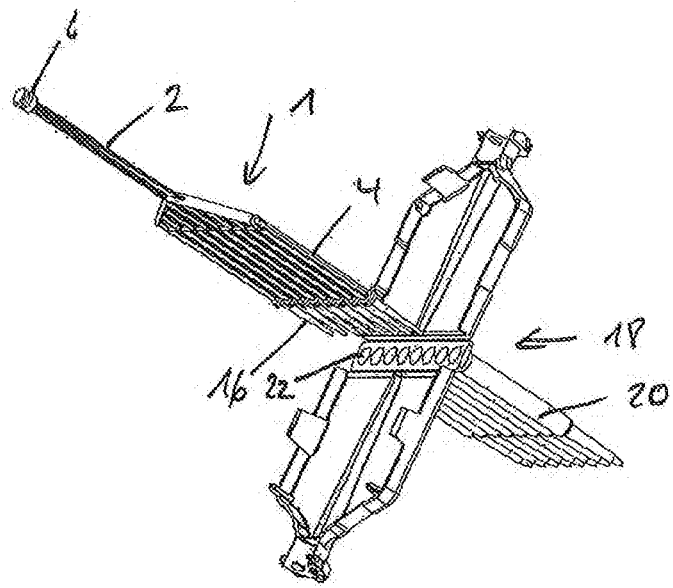
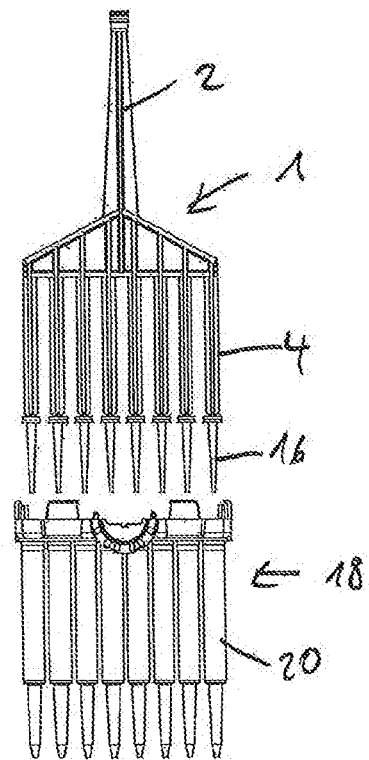
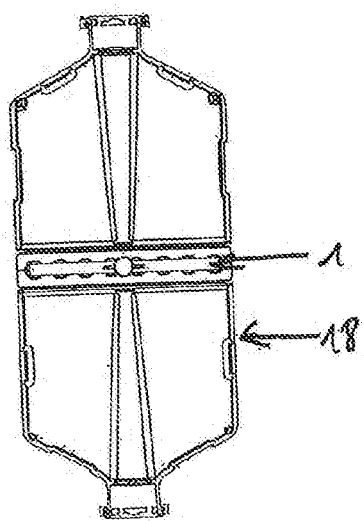
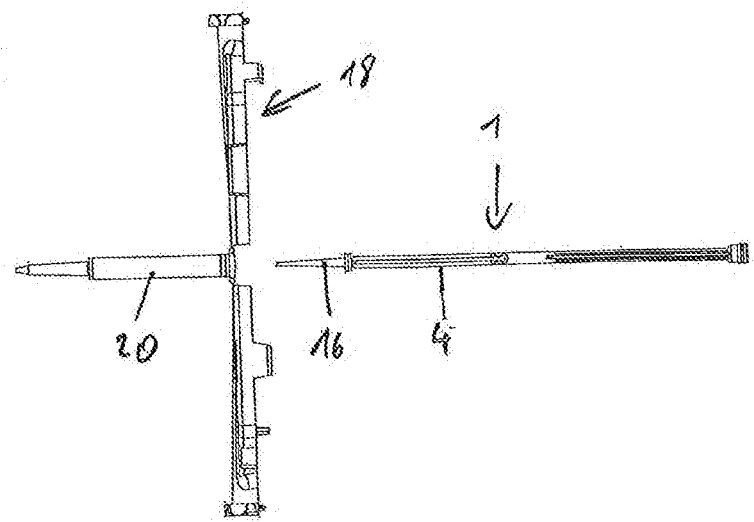

Fig. 4
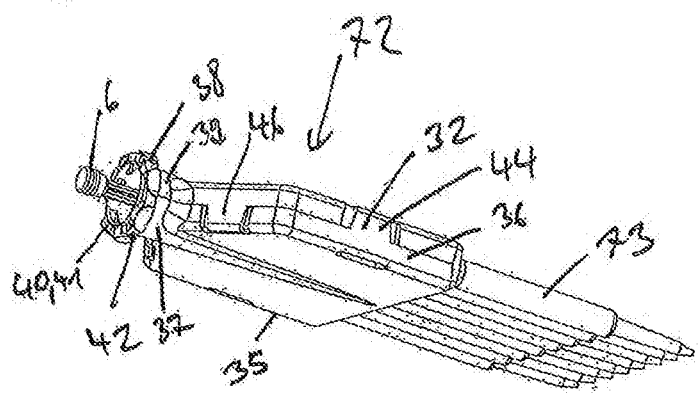
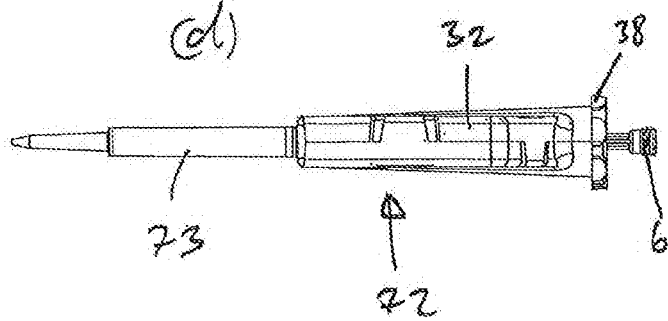
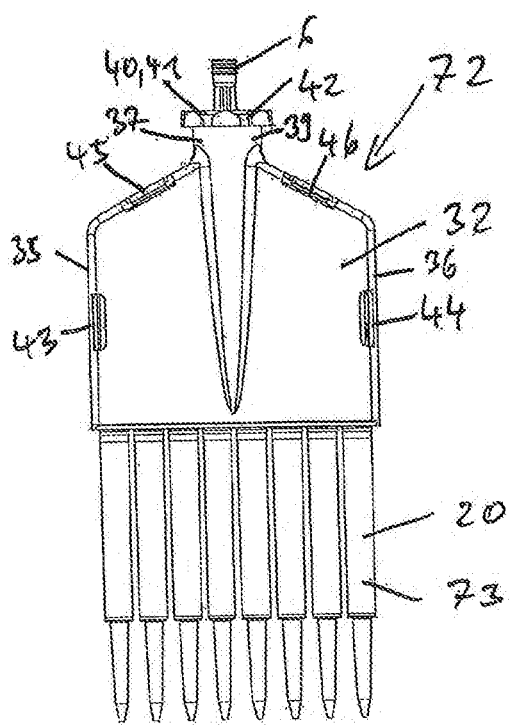

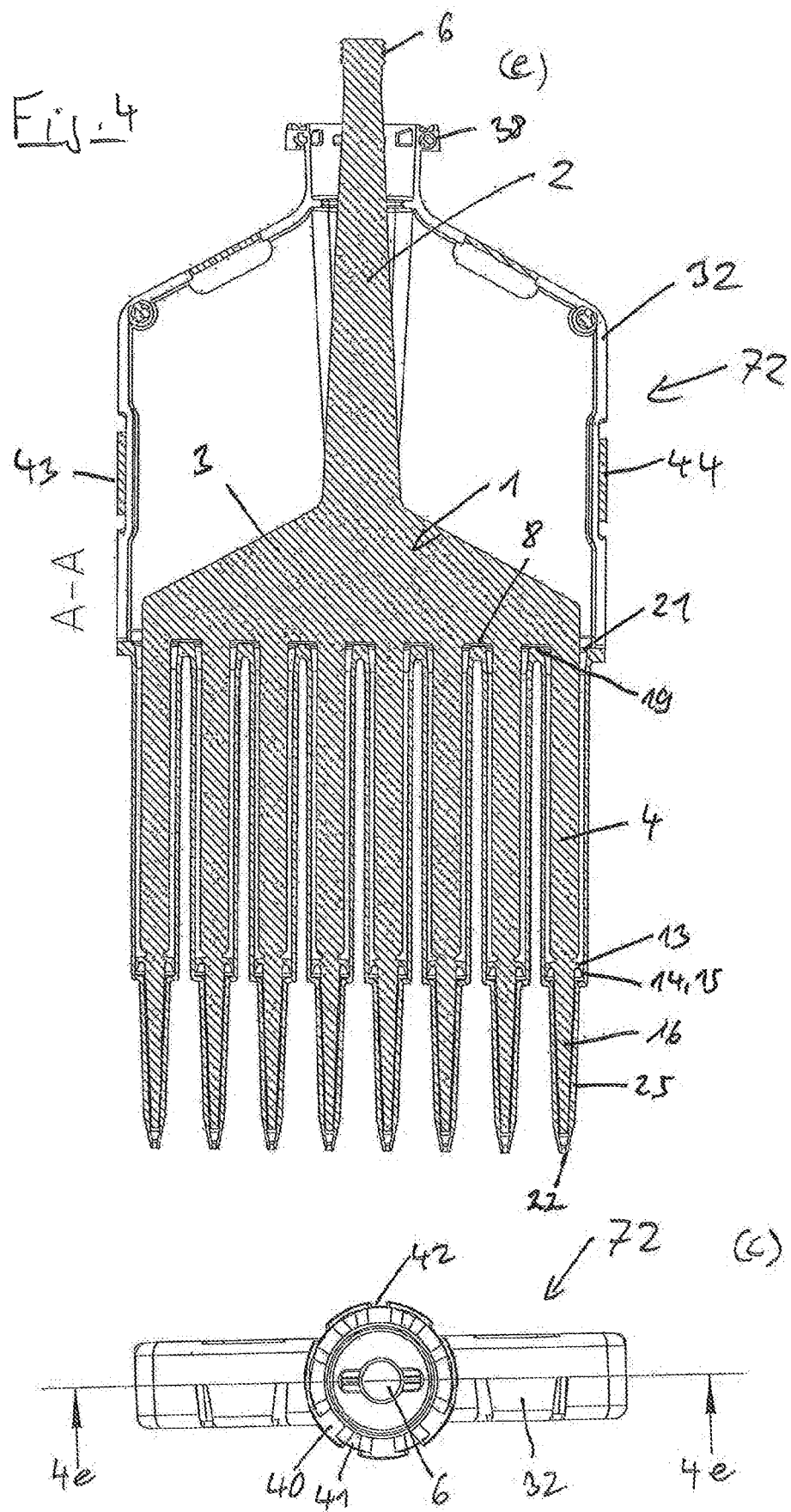

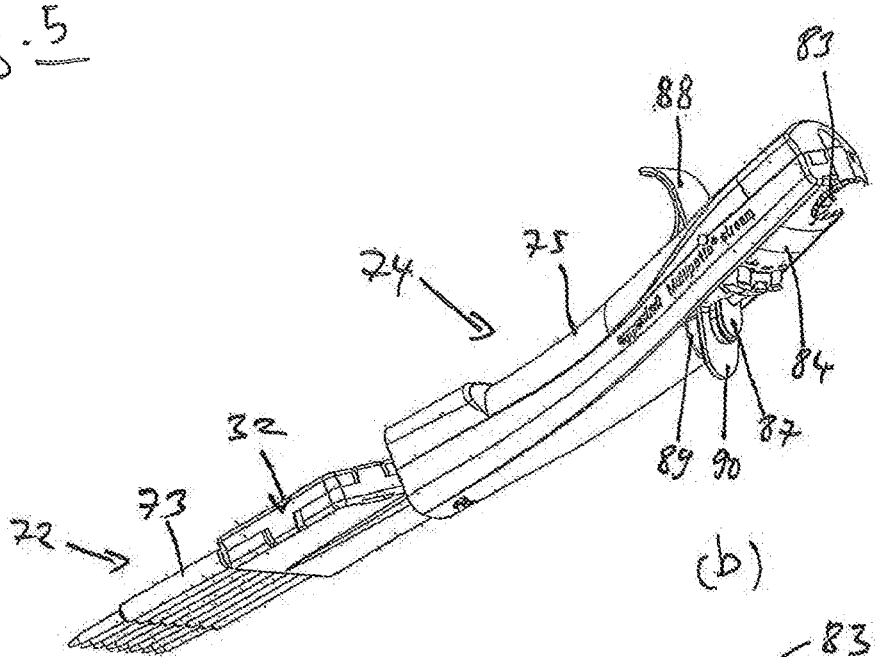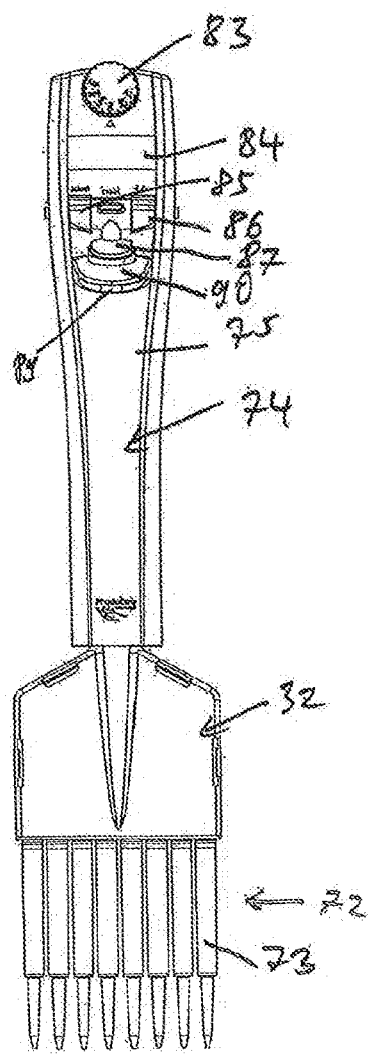

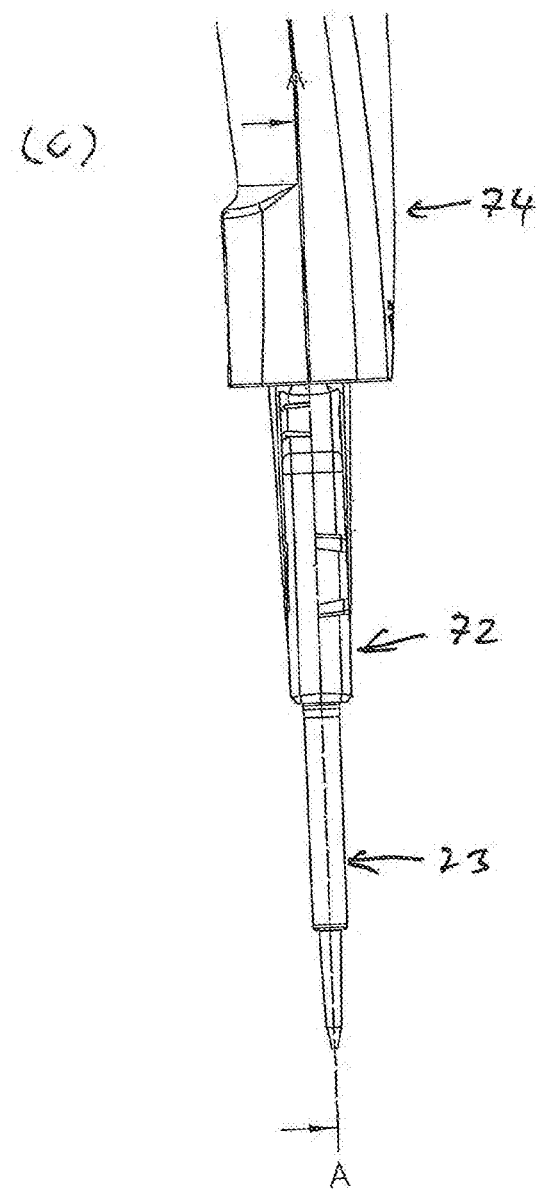
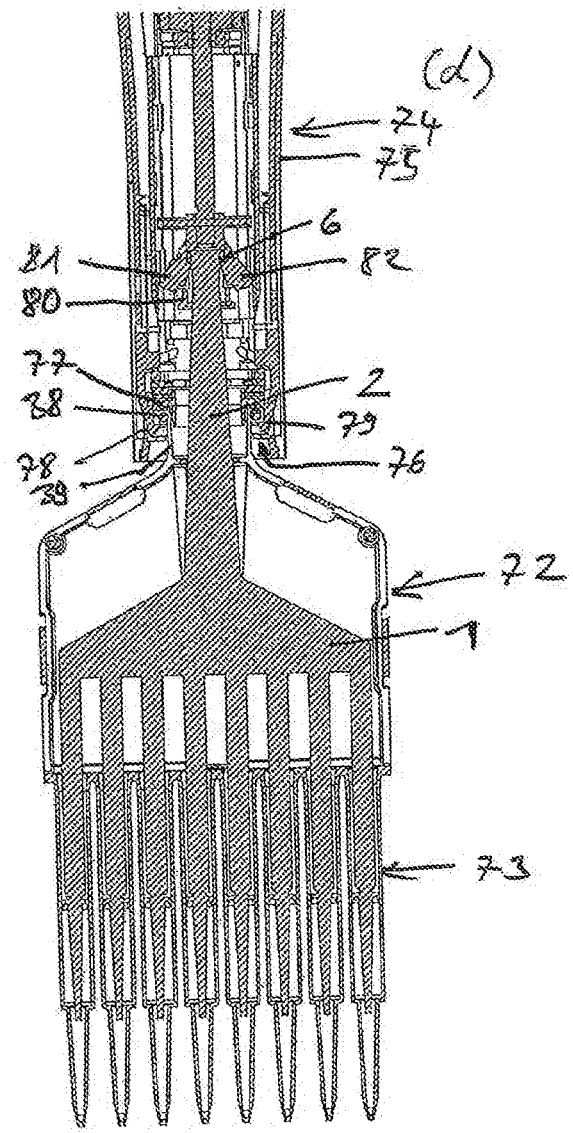
Fig. 5

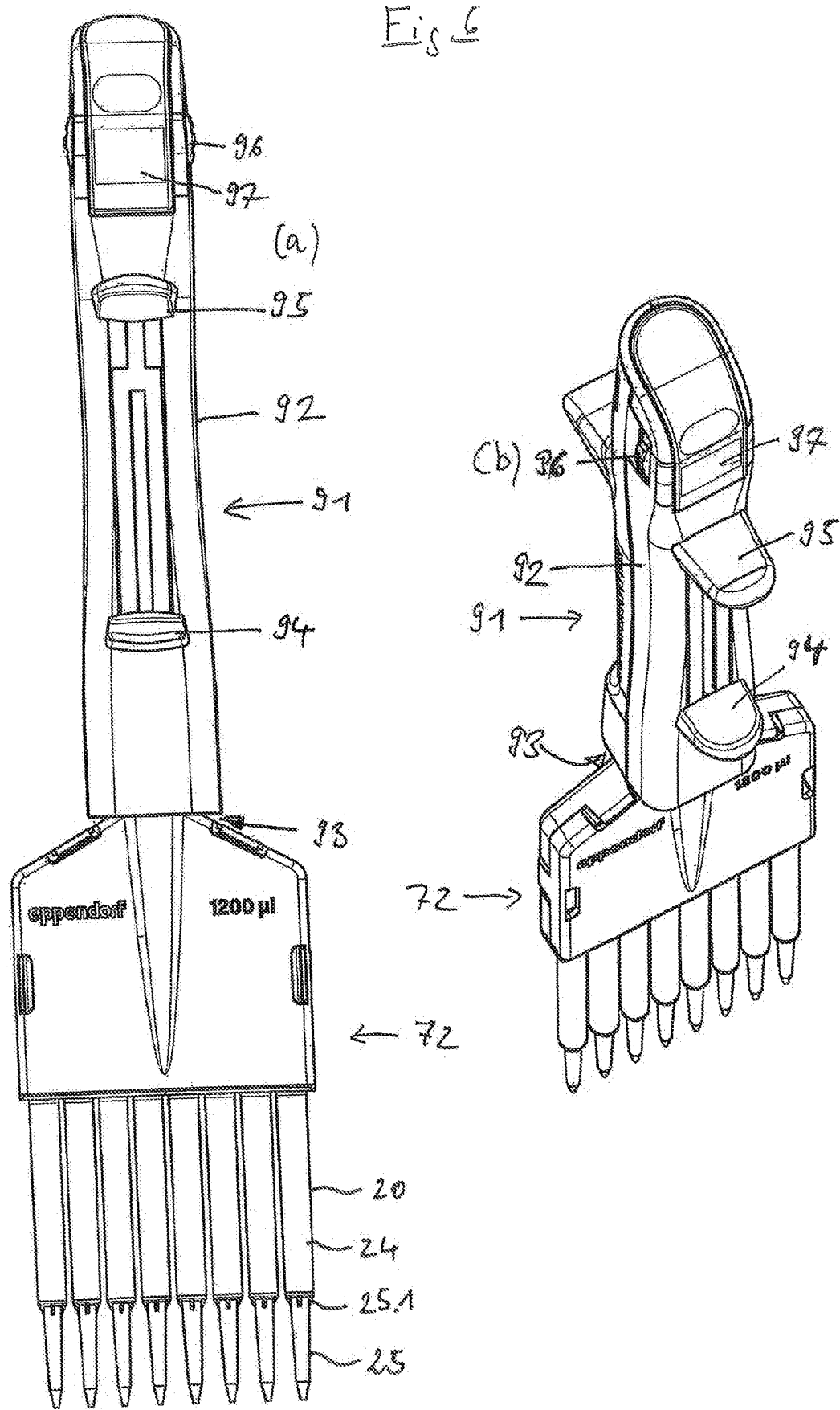

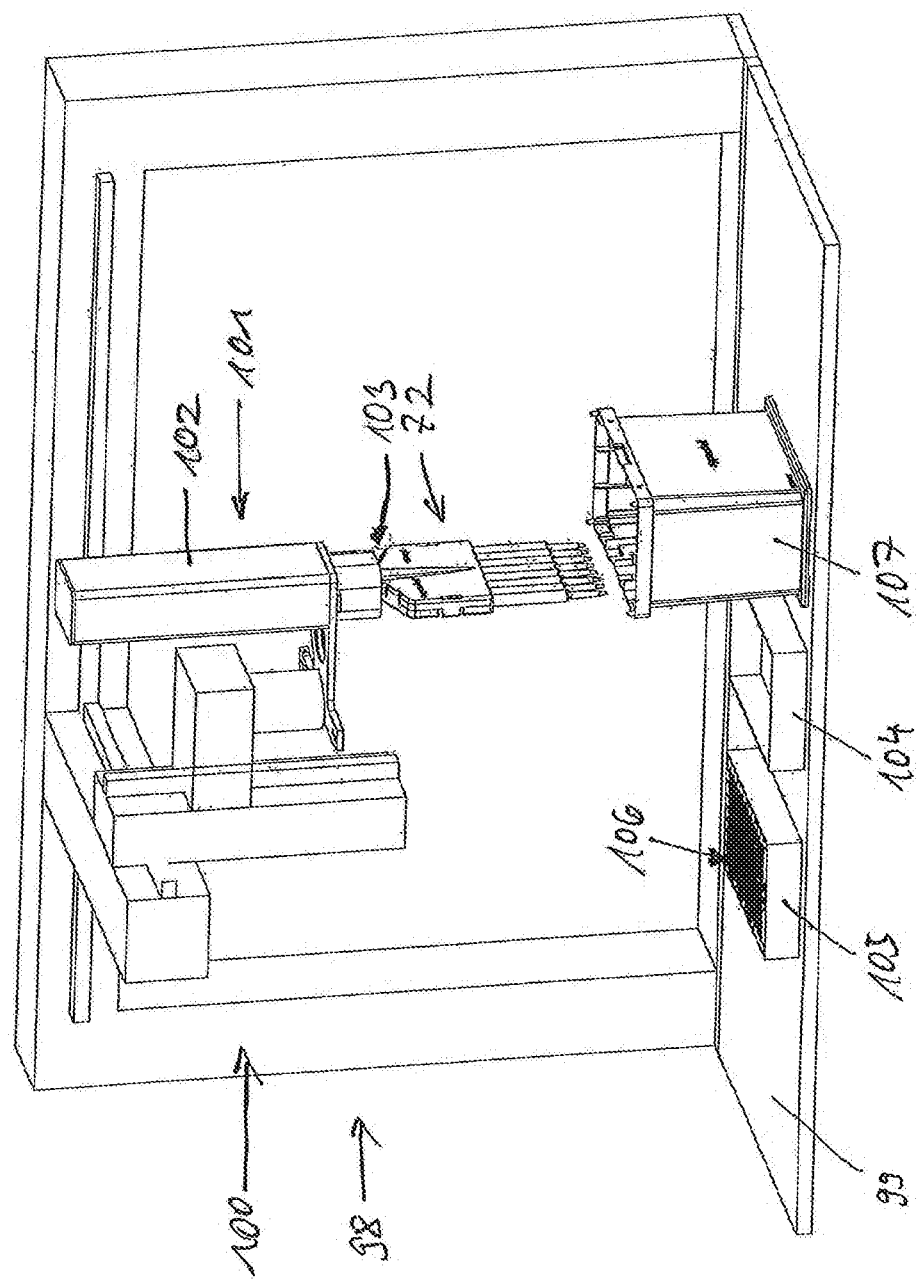

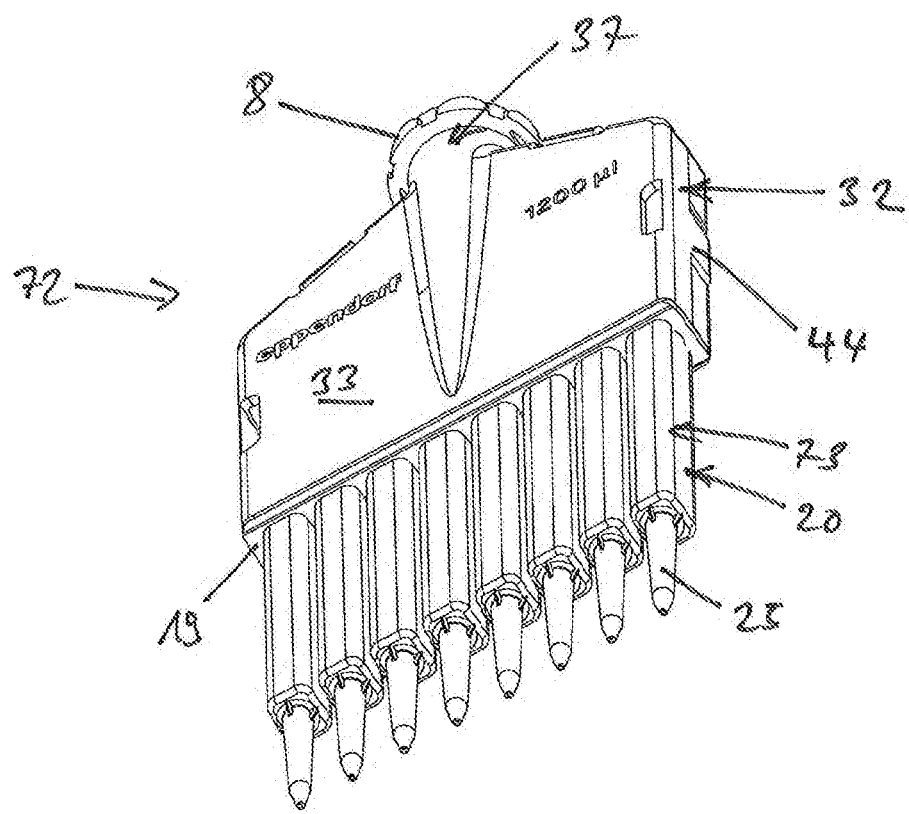

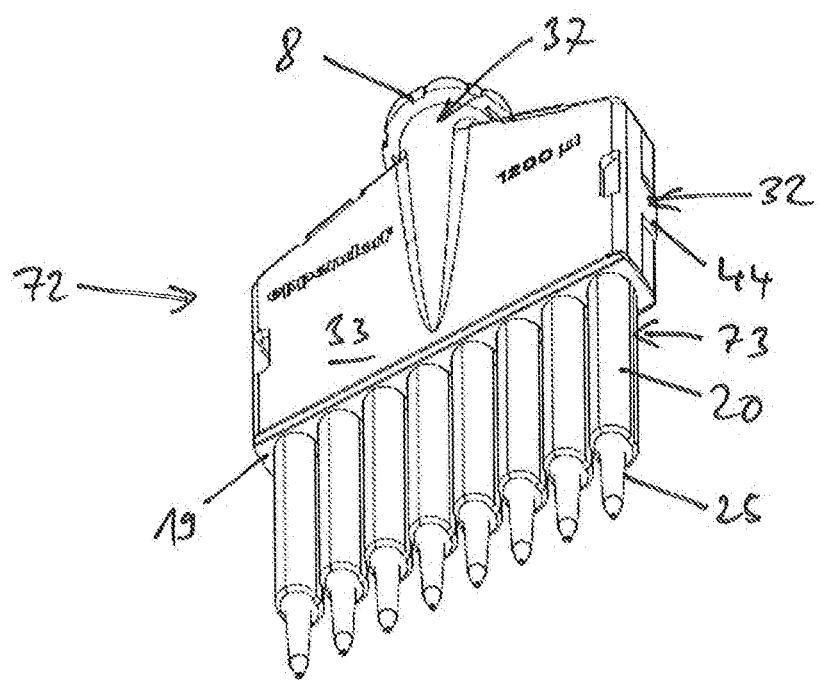

MULTICHANNEL SYRINGE FOR USE WITH A METERING DEVICE

CROSS-REFERENCE TO RELATED APPLICATIONS

This application is a National Stage of PCT/EP2017/065277 filed on Jun. 21, 2017, the contents of which is hereby incorporated by reference.

BACKGROUND OF THE INVENTION

The invention relates to a multichannel syringe for use with a metering device for metering liquids in a laboratory with a first holding apparatus for a barrel holding apparatus of a syringe barrel and an axially movable second holding apparatus for a plunger holding apparatus of a syringe plunger.

BRIEF SUMMARY OF THE INVENTION

Pipettes are used in particular in medical, biological and chemical laboratories for metering liquids. Air cushion pipettes have an integrated displacement apparatus for air and at least one seat for a pipette tip. The displacement apparatus is generally formed by a barrel with a movable plunger sealingly guided therein. If the pipette tip is held on the seat, it is connected in a communicating manner with the displacement apparatus. By means of the displacement apparatus, an air cushion can be moved so that the liquid can be sucked into, and ejected out of, the pipette tip through a tip opening. After use, the pipette tip can be detached from the seat and exchanged for a fresh pipette tip.

Multichannel pipettes serve to simultaneously draw liquid from one or more vessels and to discharge liquid into one or more vessels. Multichannel pipettes are frequently used for working with microtiter plates that have a plurality of wells in a matrix-like arrangement. Microtiter plates with 96 or 384 wells according to the SBS standard are widespread. For this, multichannel pipettes have a plurality of seats for pipette tips arranged parallel in a row next to each other at the same height. When a plurality of pipette tips are held on the seats, they are each connected in a communicating manner with a separate displacement apparatus, or a common displacement apparatus. In an adaptation of a frequently-used format of microtiter plates with 96 (=8×12) wells, multichannel pipettes frequently have 8 or 12 seats for pipette tips. After use, the plurality of pipette tips can be detached from the seats and exchanged for fresh pipette tips. Such multichannel metering devices are for example described in EP 1 739 434 B1 and in EP 2 735 369 A1.

Air cushion pipettes generally have an ejection device in order to detach the pipette tip from its seat after use without manually grasping the pipette tip. With multichannel pipettes, the force exerted for ejecting the plurality of pipette tips is higher. DE 10 2004 003 433 B4 describes a multichannel pipette which reduces the force exerted for actuating the ejection device in that it limits the force for clamping the pipette tips on the cones by spring-loaded cones and a stop.

EP 2 735 369 A1 describes a multichannel pipette which reduces the exerted force for actuating the ejection device in that the ejector has various ejector parts that sequentially press the pipette tips off of the cones.

The disadvantage of air cushion pipettes is that they are poorly suitable or unsuitable for metering highly-viscous or foaming liquids, or liquids with a high vapor pressure. With highly viscous or foaming liquids, a low metering speed is needed; liquids with a high vapor pressure can only be metered imprecisely. Another imprecision arises from the change in length of the air cushion from the weight of the liquid column in the pipette tip, and from the change in length of the air cushion from temperature changes. Consequently, the volume displacement by the displacement apparatus deviates from the liquid volume drawn into the pipette tip. Furthermore, aerosols from the liquid drawn into the pipette tip can migrate into the air cushion pipette and contaminate it. Multichannel pipettes consist of a plurality of individual parts and are particularly complex. Air cushion pipettes are highly restricted in terms of fitability with pipette tips of different volumes since the integrated displacement apparatus has a set displacement volume.

Positive displacement pipettes have an integrated drive for a syringe plunger of a syringe. A syringe consisting of plastic can be connected to the positive displacement pipette so that the syringe barrel is held on the positive displacement pipette, and the syringe plunger is coupled to the drive. The drive moves the syringe plunger so that liquid is sucked into and ejected through a syringe opening. In doing this, the syringe plunger remains in contact with the liquid. After metering, the used syringe can be exchanged for a fresh syringe. Since an air cushion does not form between the syringe plunger and liquid, positive displacement pipettes are also suitable for metering highly viscous or foaming liquids, or liquids with a high vapor pressure. Imprecisions from the change in length of an air cushion and contamination by aerosols are avoided.

The Biomaster® positive displacement pipette by Eppendorf AG is designed to discharge liquids drawn into a small syringe in a single step (pipetting).

Positive displacement pipettes are generally designed as dispensers (also termed "repeating pipettes"). By means of a dispenser, liquid can be drawn into a syringe and discharged stepwise therefrom (dispensing). Dispensers are known in which the dosage to be discharged in each step can be adjusted. Positive dispensing pipettes can be variably fitted with syringes having different fill volumes that differ from each other by different diameters, or respectively lengths of the syringe barrel. Dispensers allow for a high dosage variability.

Air cushion pipettes and positive displacement pipettes with manually driven or electric motor drives are known. Dispensers with electric motor drives are also useful for pipetting, i.e., for dispensing the drawn liquid in a single dispensing step.

A manually driven dispenser with dosage adjustment is described in DE 29 26 691 C2 and U.S. Pat. No. 4,406,170. A commercial design of this dispenser is the Multipette® 4780 by Eppendorf AG. This dispenser can be fitted with a syringe, such as Combitips® by Eppendorf AG, wherein syringes with different fill volumes can be selected. With the Plus/8-Adapter, the Multipette® 4780 dispenser can be transformed into an eight-channel manual dispenser. A cartridge that contains eight plastic syringes fits in the adapter. Eight pipette tips can be clamped onto the eight plastic syringes. An air cushion is moved by the plastic syringe so that the liquid is drawn into the pipette tip and sucked into it. The dispenser is converted into an air cushion pipette.

U.S. Pat. No. 4,591,072 describes a dispenser that has an actuation button that can be actuated opposite the effect of a return spring. The actuation button is connected by a rack to a slide. The slide is releasably connected to the plunger of a syringe unit that comprises a plurality of identical syringes. The slide is connected by a drive rod to a drawing button that is movably arranged on the outside of the dispenser. A pawl works together with the rack, wherein it is disengaged from the rack when the actuation button is not actuated and is engaged with the rack when the actuation button is actuated in order to enable the stepwise dispensing of equal size amounts of liquid from all the syringes. The syringe unit comprises individual prefabricated syringes that are inserted in a holder. The holder is in turn inserted in the dispenser so that the syringe plunger engages with the slide. It is complex to fit the syringe unit with syringes and exchange used syringes for fresh syringes.

The model 8800 by Nichiryo America Inc. is a commercial design of a similar dispenser with eight channels.

JP 3389352 B2 describes a dispensing machine with a multichannel pipette and pipette tips that can be mounted thereupon. The multichannel pipette comprises a single-part plunger unit with a plurality of parallel plungers on a crossmember that is rigidly connected by a rod to a drive apparatus. A single-part barrel unit of the multichannel pipette comprises a plate and a barrel that projects downward therefrom. Each plunger engages in a barrel and is sealingly guided on the top edge of the plate through an O-ring. The plate and the O-rings are fixed at the bottom side of a bottom wall of a housing of the dispensing machine. There is no provision for switching the plunger unit and the barrel unit. To meter different liquid volumes, the multichannel pipette comprises plungers with a small outer diameter that engage in barrels with a correspondingly small inner diameter, and plungers with a large outer diameter that engage in barrels with a correspondingly large inner diameter.

DE 197 50 145 A1 describes a multi-barrel pipette with a set of at least three barrels, of which each comprises one plunger. The set of barrels is composed of separate elements, of which at least one is a multi-barrel element with at least two barrels. With a multi-use barrel element, each barrel is connected to a separate syringe element for mounting a pipette tip. Two plungers are inserted into the barrel that are sealingly guided through a seal above the barrel. The two plungers consist of a plurality of parts that are pressed against one another along surfaces that face each other so that a projection of the one plunger engages in a recess of the other plunger. The plunger parts connected to each other have a flange at the top end. A plurality of plunger pairs are held by their flanges to an actuating arm that is connected to a plunger rod that has an operating button on its top end. With another multi-use barrel element, two barrels are connected at their bottom end to a single tip element for mounting a pipette tip. A plurality of multi-barrel elements are combined into a body at the bottom end of the handle of the multi-channel pipette.

Against this backdrop, the object of the invention is to create a syringe unit comprising a plurality of syringes that is more user-friendly and less complex.

The multichannel syringe according to the invention for use with a metering device for metering liquids in a laboratory with a first holding apparatus for a barrel holding apparatus of a syringe barrel and an axially movable second holding apparatus for a plunger holding apparatus of a syringe plunger comprises:

a single-part plunger unit made of plastic, said plunger unit having a drive rod comprising the plunger holding apparatus on the upper end, a crossmember which is oriented perpendicularly to the drive rod on the lower end of the drive rod, and a plurality of syringe plunges that project and downward and are parallel to the drive rod, a single-part barrel unit made of plastic comprising a support and at least one row of syringe barrels which are arranged adjacently in a parallel manner, which protrude downwards from the support, and which each have lower syringe openings, upper syringe openings, and a running region in the interior for one syringe plunger of the plunger unit, wherein each syringe plunger engages into a syringe barrel through an upper syringe opening and is sealingly guided in the running region, and the barrel holding apparatus is arranged above the syringe barrel and is connected to the support.

The multichannel syringe according to the invention has the advantage that the plunger unit made of plastic comprising the plurality of syringe pistons and the barrel unit made of plastic comprising the plurality of syringe barrels and a support connected thereto can each be produced in a particularly economical method with high yields. The plunger unit and barrel unit can both be produced with particularly low tolerances so that particularly low-tolerance multichannel syringes can be made therefrom. By joining the plunger unit and the barrel unit, a plurality of parallel syringes of the multichannel syringe are formed simultaneously. The joining of the plunger unit and barrel unit can be accomplished particularly easily and quickly and is particularly suitable for automation. Since the multichannel syringe works as a positive displacer, it is suitable for use with highly viscous or foaming liquids, or liquids with a high vapor pressure. Moreover, the system-related imprecisions of air cushion pipettes and contamination of the metering device are avoided. In comparison to conventional multichannel pipettes, the complexity of the multichannel syringe is slight because complex individual parts for making the displacement apparatuses, spring-loaded cones and ejection apparatuses are avoided. Given the simple construction, the multichannel syringe has only a low weight. This facilitates handling when using the multichannel syringe with a metering device designed as a handheld apparatus. Stationary metering devices for use with the multichannel syringe can be designed more simply due to the reduced loads. Furthermore, the variability of the fill volumes of the syringes is particularly large with the multichannel syringe according to the invention. Syringes with different fill volumes can be easily created by plunger units with syringe plungers and barrel units with syringe barrels with different diameters and/or different lengths. The barrel holding apparatus and the plunger holding apparatus are arranged above the syringe barrel. The barrel holding apparatus can easily be connected to a first holding apparatus, and the plunger holding apparatus can be connected to a second holding apparatus of a metering device. The barrel holding apparatus and the plunger holding apparatus of the multichannel syringe are preferably designed for use with a metering device as with the barrel holding apparatus and plunger holding apparatus of conventional single syringes. This makes it possible to use the multichannel syringe with conventional metering devices that are already used with single syringes. The connection of the multichannel syringe to the metering device and the detachment of the multichannel syringe are the same as when connecting the metering device to conventional single syringes. A greater exertion of force is unnecessary for this. The multichannel syringe can advantageously be used as a disposable part, in particular in a sterile design.

According to a preferred embodiment, the plunger holding apparatus is designed so as to be detachably connected to the second holding apparatus, and the barrel holding apparatus is designed so as to be releasably connected to the first holding apparatus of the metering device.

According to a preferred embodiment of the invention, the crossmember is plate-shaped, has a linear base oriented perpendicular to the drive rod from which the syringe plungers project downward, and has a first upward tapering, wherein the drive rod projects upward from the top end of the crossmember. This embodiment is particularly advantageous with regard to the transmission of force from the drive rod to the syringe plunger and saves material. According to a preferred embodiment, the crossmember is designed in a triangular or trapezoidal shape.

According to another embodiment, each syringe plunger has a plunger rod that is connected at the top to the crossmember and at the bottom to a plunger which is sealingly guided in the running region. In this embodiment, the syringe plungers are designed to be particularly material-saving and low-friction in the running region. According to another embodiment, each plunger is designed in the shape of a (circular) disk. According to another embodiment, the plunger has a solid profile, and the plunger rod has a cross profile, double-T profile, hollow profile, or another profile with a smaller cross-sectional surface than the solid profile of the plunger.

According to another embodiment, each syringe plunger has a peripheral sealing region. The sealing region runs around a longitudinal axis (such as a middle axis) of the syringe plunger, in the direction of which the syringe plunger can be moved in the syringe barrel. The sealing region sealingly abuts the running region. The syringe plunger can be moved in the running region with the sealing region that sealingly abuts the running region. In so doing, the sealingly abutting sealing region is moved in the running region from top to bottom and from bottom to top. In another embodiment, the peripheral sealing region is the peripheral surface, or a section of the peripheral surface, of the syringe plunger. For example, the sealing region is the entire peripheral surface, or radially projecting bottom section of the peripheral surface, of a disk-shaped or rod-shaped (e.g. cylindrical) syringe plunger.

According to another embodiment, each syringe plunger has at least one sealing element. The sealing element of each syringe plunger sealingly abuts the plunger running region. According to another embodiment, each plunger has at least one peripheral sealing element on the perimeter. In this embodiment, the sealing region is formed by at least one sealing element. According to another embodiment, the sealing element is a sealing lip. According to another embodiment, the sealing element is a sealing bead. According to another embodiment, the sealing element is a sealing lip that bears a sealing bead. According to another embodiment, each plunger is integrally connected to the sealing element. This is in particular the case with a disk-shaped syringe plunger. With a rod-shaped (e.g. cylindrical) syringe plunger that is connected directly or via a plunger rod to the crossmember, the sealing element is preferably arranged at the bottom end on the perimeter of the syringe plunger. According to another embodiment, the sealing lip is apron-shaped, wherein it extends downward from the perimeter of the syringe plunger. According to another embodiment, the sealing lip has a peripheral thickening that sealingly lies against the running region.

According to another embodiment, the running region of the syringe barrel is cylindrical. According to another embodiment, the running region has a circular, oval or polygonal cross section. The syringe plungers have a cross-section that is adapted to the running region. Oval or polygonal (such as rectangular) cross-sections allow syringe barrels with a larger volume to be arranged on a support with given dimensions.

According to another embodiment, each syringe plunger has a plunger tip at the bottom end, and each syringe barrel has a barrel tip at the bottom end into which the plunger tip can be inserted. Residual amounts of liquid are thereby removed from the multichannel syringe.

According to another embodiment, the crossmember, and/or the drive rod, and/or the plunger rods have ribs which project outward and extend parallel to the syringe plungers. The stability is improved by the ribs, and a material-saving design is promoted.

According to another embodiment, the support comprises a linear or flat support structure, wherein the linear support structure (such as a strip or bar) is integrally connected to syringe barrels projecting downward from the linear support structure and arranged in a row parallel to each other, or the flat support structure (such as a plate or a grid) is connected to syringe barrels that project downward from the flat support structure and are arranged parallel to each other in a plurality of parallel rows, the support structure is connected to at least one connecting structure projecting upward from the support structure, and the connecting structure is connected to the barrel holding apparatus at a distance from the support structure. The connection of the multichannel syringe to the metering device can thereby be simplified. This is in particular the case when the barrel holding apparatus comprises a hollow cylindrical retaining pin, and the drive rod of the plunger unit is arranged on the middle axis of the retaining pin. According to another embodiment, the support structure is designed integrally with the connecting structure. According to a preferred embodiment, the retaining pin has a peripheral flange that projects radially outward, has part of a bayonet connection, or has other means for releasably connecting to the first holding apparatus of a metering device.

According to another embodiment, the support structure is a bottom wall of a housing, and the connecting structure comprises a plurality of sidewalls of the housing. According to another embodiment, the connecting structure comprises at least one linear connecting element, or at least one grid frame. According to another embodiment, the support structure is connected integrally by a film hinge to the connecting structure. According to another embodiment, the support structure is connected integrally by means of film hinges to support structures on two longitudinal sides that oppose each other, at least one connecting structure is connected at the top to the barrel holding apparatus, the connecting structures are folded at the film hinges, and the folded connecting structures are connected to each other. This is advantageous for producing the barrel unit by injection molding.

According to another embodiment, the connecting structure is integrally connected to the barrel holding apparatus. Alternatively, the barrel holding apparatus and the connecting structures are produced separately and connected to each other. For this, for example two connecting structures have grooves or projections on the inner sides, wherein when the connecting structures are folded together, edges of the barrel holding apparatus engage with the grooves or projections, and this connects the barrel holding apparatus to the connecting structures.

According to another embodiment, the support comprises a bottom wall of a housing that is formed integrally with the syringe barrels, and the housing has sidewalls that project from the bottom wall upward and are connected at the top to the barrel holding apparatus. The stability of the support can be increased by the housing, material can be saved, and the syringes can be protected from contaminants. According to another embodiment, the housing is a box-shaped housing.

According to another embodiment, the support comprises the housing such that it is a component of the barrel unit. This embodiment can be designed in a manner that is particularly stable and saves material.

According to another embodiment, the bottom wall is connected integrally by means of film hinges to the sidewalls on two longitudinal sides that oppose each other, at least one sidewall is connected at the top to the barrel holding apparatus, the sidewalls are folded at the film hinges, and the folded sidewalls are connected to each other. This is advantageous for production by injection molding because an injection mold for injection molding the barrel unit with unfolded sidewalls can be designed particularly easily and the barrel unit can be easily demolded after injection molding. The folding simplifies the fabrication of the multichannel syringe.

According to another embodiment, the sidewalls have narrow sidewall parts that project from their two side edges, wherein in each case two narrow sidewall parts of the folded sidewalls jointly form a narrow sidewall. In this configuration, each sidewall with the sidewall parts connected thereto forms a housing shell, and the housing is formed from the two housing shells and the bottom wall. This configuration is also advantageous for production by injection molding.

According to another embodiment, the support formed integrally with the syringe barrels is formed solely by a linear support structure. The linear support structure is for example a bottom wall of a housing. The bottom wall can for example be connected to the housing in that two housing shells with grooves or projections on the inner sides for edges of the bottom wall are assembled into a housing by inserting the edges of the bottom wall into the grooves or projections. In an assembled state, the bottom wall is held in the housing. According to another embodiment, the linear support is connected by a connecting structure to the barrel holding apparatus, wherein the connecting structure is for example formed by one or more linear connecting elements or a grid frame between the support and barrel holding apparatus. This embodiment works without a housing.

According to another configuration, the support is connected integrally to the barrel holding apparatus. Production is further simplified by this configuration. Production can be advantageously implemented by injection molding. Alternatively, the barrel holding apparatus and the support are produced separately and connected to each other. For this, for example the support has two housing shells that have grooves or projections on the inner sides and can be assembled, wherein while assembling, edges of the barrel holding apparatus are received by the grooves or projections, and this connects the barrel holding apparatus to the housing shells.

According to a preferred embodiment, the plunger holding apparatus and the barrel holding apparatus are designed as is the case with the syringe of the repeating pipette system according to EP 0 656 229 B1 and U.S. Pat. No. 5,620,660A, such that the multichannel syringe can be used with the repeating pipette of the repeating pipette system described in EP 0 656 229 B1 and U.S. Pat. No. 5,620,660A. According to another embodiment, the plunger holding apparatus and the barrel holding apparatus of the multichannel syringe are designed like the plunger holding apparatus and the barrel holding apparatus of the syringe described in EP 2 279 791 B1 and U.S. Pat. No. 8,813,584 B2, such that the multichannel syringe can be used with the metering device described in EP 2 279 791 B1 and U.S. Pat. No. 8,813,584 B2. With regard to the barrel holding apparatus and the plunger holding apparatus, reference is made to the barrel holding apparatus and the plunger holding apparatus of the single syringes from EP 0 656 229 B1, U.S. Pat. No. 5,620,660A or EP 2 279 791 B1, and U.S. Pat. No. 8,813,584 B2, the content of which is hereby incorporated into this application.

According to another embodiment, the barrel holding apparatus has an annular disk-shaped flange, and the drive rod is arranged on the middle axis of the flange. The flange can lie against an annular stop of the metering device and be securely held thereto by gripping apparatuses of the metering device.

The flange can be connected directly to the top edge of the housing. The housing can have cutouts in the top edge that allow the bottom edge of a metering device to be engaged, and the flange to be gripped by gripping apparatuses of the metering device.

According to another embodiment, the barrel holding apparatus has a hollow cylindrical retaining pin, and the drive rod is arranged on the middle axis of the retaining pin. According to another embodiment, the flange is connected to the top end of the retaining pin. The retaining pin facilitates gripping the cylinder unit. In particular, the retaining pin facilitates gripping the flange by means of gripping apparatuses of the metering device. Furthermore, the retaining pin is advantageous for the transmission of force from the flange into the housing.

According to another embodiment, the housing has a second tapering at the top. The second tapering is preferably adapted to the shape of a triangular or trapezoidal crossmember in order to receive it when pulling out the plunger unit from the barrel unit. It promotes a material-saving embodiment of the housing.

According to another embodiment, the barrel holding apparatus has two halves, wherein each half is connected to a sidewall of the housing, and the two halves lie against each other on edges that are diametrically opposed to each other. This embodiment is particularly advantageous for the integral design of the barrel holding apparatus with a housing. When joining the housing parts, the halves of the barrel holding apparatus are also joined. This simplifies production.

According to another embodiment, the sidewalls and/or the halves of the barrel holding apparatus are connected to each other by locking elements, and/or by hot caulking, and/or by welding, and/or by adhesive bonding, and/or by centering elements. Preferably, the sidewalls and/or the halves of the barrel holding apparatus are connected to each other, and/or are aligned with each other, by locking elements. Production is thereby simplified. It is also advantageous that the connecting elements do not have to be particularly stable because the housing parts and/or the halves of the barrel holding apparatus are additionally held together by the metering device when in use.

According to another embodiment, the barrel holding apparatus has a code at the top edge. The multichannel syringe can be provided with a code as with conventional single syringes so that the metering device can recognize the multichannel syringes and for example can display the set metered amounts. In this regard, reference is made to the coding of a single syringe according to EP 0 657 216 B1 and U.S. Pat. No. 5,620,661 A, and to the coding with test elements of a single syringe according to EP 2 574 402 B1 and U.S. Pat. No. 9,291,529 B2, the content of which is hereby incorporated in this application.

Since the syringe plungers are guided in the syringe barrels of the multichannel syringe, an alignment of the plunger holding apparatus relative to the barrel holding apparatus makes it easier to connect to the first and second holding apparatus of a metering device.

According to another embodiment, the housing has bars that project on the inside and are slotted in an axial direction of the drive rod and into which the ribs of the drive rod engage. This yields additional guidance of the plunger unit in an axial direction. The precision of the alignment of the plunger holding apparatus on the second holding apparatus of a metering device is improved by this guidance.

According to another embodiment, each barrel unit has a barrel tip that tapers downward at the bottom in the running region, and centering ribs that taper downward on the outside on an outer step between the running region and barrel tip. The centering ribs facilitate centering the barrel units in deep sample containers.

According to another embodiment, the top ends of adjacent barrel units are connected to each other by bars. According to another embodiment, the bars are connected to the bottom side of the support. According to another embodiment, they are connected to the bottom plate or to the support structure of the support. The bars promote parallel alignment of the barrel units relative to each other in that they draw them into the intended alignment when cooling after injection molding.

The plunger holding apparatus can be formed exclusively by the top end of the drive rod. This has for example a cylindrical profile, or a box profile, or a cross profile. According to a preferred embodiment, the plunger holding apparatus is a cylindrical coupling piece at the top end of the drive rod.

According to preferred embodiments, the multichannel syringe comprises 8, 12, 16, 24, 32, 96, or 384 syringes. This is advantageous for metering liquids using microtiter plates with 96 or 384 wells. According to another embodiment, the syringe barrels have bottom barrel openings of the syringe barrels at a distance from each other that corresponds to the distance between two adjacent wells in a defined direction of a standardized microtiter plate (SBS standard).

According to another embodiment, the plunger unit is injection molded as a single part, and/or the barrel unit, and/or the housing, and/or the barrel holding apparatus are injection molded as a single part.

The plunger unit, and/or the barrel unit, and/or the housing, and/or the barrel holding apparatus are each made of plastic or a plurality of plastics.

According to a preferred embodiment, the plunger unit, and/or the barrel unit, and/or the housing, and/or the barrel holding apparatus are each made of at least one polyolefin or other thermoplastics. According to a preferred embodiment, the plunger unit is made of polyethylene and the barrel unit is made of polypropylene, or vice versa. This yields a particularly effective tribological pairing between the syringe plungers and syringe barrels.

Moreover, the invention relates to the use of a multichannel syringe with a metering device for metering liquids in a laboratory with a first holding apparatus for a barrel holding apparatus of a syringe barrel and an axially movable second holding apparatus for a plunger holding apparatus of a syringe plunger.

According to a preferred embodiment, the multichannel syringe is used with a portable or stationary metering device that is manually driven or driven by an electric motor.

The multichannel syringe can be used with manually driven dispensers in order to dispense the drawn amounts of liquid in several steps. Furthermore, the multichannel syringes can be used with dispensers that are driven by an electric motor by means of which the drawn amount of liquid can be dispensed in several metering steps, or entirely in a single metering step. The multichannel syringe can be used with portable metering devices that can be held in one hand by the user while metering. Furthermore, the multichannel syringe can be used with stationary metering devices, in particular with metering machines or laboratory machines. With these, the second holding apparatus is driven by an electric motor so that they allow the drawn amount of liquid to be dispensed in several metering steps as well as in a single metering step. The metering device can be a metering device for use with a single syringe, or a metering device designed specially for the multichannel syringe.

In the present application, the statements "top" and "bottom" and "above" and "below" as well as terms derived therefrom refer to an alignment of the multichannel syringe with vertical syringe plungers and syringe barrels, wherein the bottom syringe openings are directed downward, and the top syringe openings are directed upward.

BRIEF DESCRIPTION OF THE SEVERAL VIEWS OF THE DRAWINGS

The invention is explained in greater detail below based on the appended drawings of an exemplary embodiment. In the drawings:

FIG. 1a shows a perspective view obliquely from the front and from the side of a plunger unit of a multichannel syringe;

FIG. 1b shows a front view of a plunger unit of a multichannel syringe;

FIG. 1c shows a plan view of a plunger unit of a multichannel syringe;

FIG. 1d shows a side view of a plunger unit of a multichannel syringe;

FIG. 3a shows a perspective view obliquely from the front and from the side of the plunger unit and the barrel unit when joining the multichannel syringe;

FIG. 3b shows a front view of the plunger unit and the barrel unit when joining the multichannel syringe;

FIG. 3c shows a plan view of the plunger unit and the barrel unit when joining the multichannel syringe;

FIG. 3d shows a side view of the plunger unit and the barrel unit when joining the multichannel syringe;

FIG. 4a shows a perspective view obliquely from the front and from the side of the multichannel syringe;

FIG. 4b shows a front view of the multichannel syringe;

FIG. 4c shows a plan view of the multichannel syringe;

FIG. 4d shows a side view of the multichannel syringe;

FIG. 4e shows a vertical sectional view along axis 4e-4e from FIG. 4c of the multichannel syringe;

FIG. 5a shows a perspective view obliquely from the front and from the side of the multichannel syringe connected to an electronically driven portable metering device;

FIG. 5b shows a front view of the multichannel syringe connected to an electronically driven portable metering device;

FIG. 5c shows a side view of the multichannel syringe with the bottom part of the metering device of the multichannel syringe connected to an electronically driven portable metering device;

FIG. 5d shows a vertical sectional view of the multichannel syringe and the bottom part of the metering device of the multichannel syringe connected to an electronically driven portable metering device;

FIG. 6a shows a perspective view obliquely from the front and from the side of the multichannel syringe connected to a manually driven, portable metering device;

FIG. 6b shows a front view of the multichannel syringe connected to a manually driven, portable metering device;

FIG. 7 shows the multichannel syringe connected to a metering machine in a perspective view obliquely from the front and from the side;

FIG. 8b shows a perspective view obliquely from below and from the side of another multichannel syringe with barrel units with a rectangular cross-section;

FIG. 9b shows a perspective view obliquely from below and from the side of another multichannel syringe with barrel units with an oval cross-section.

Figure 2:
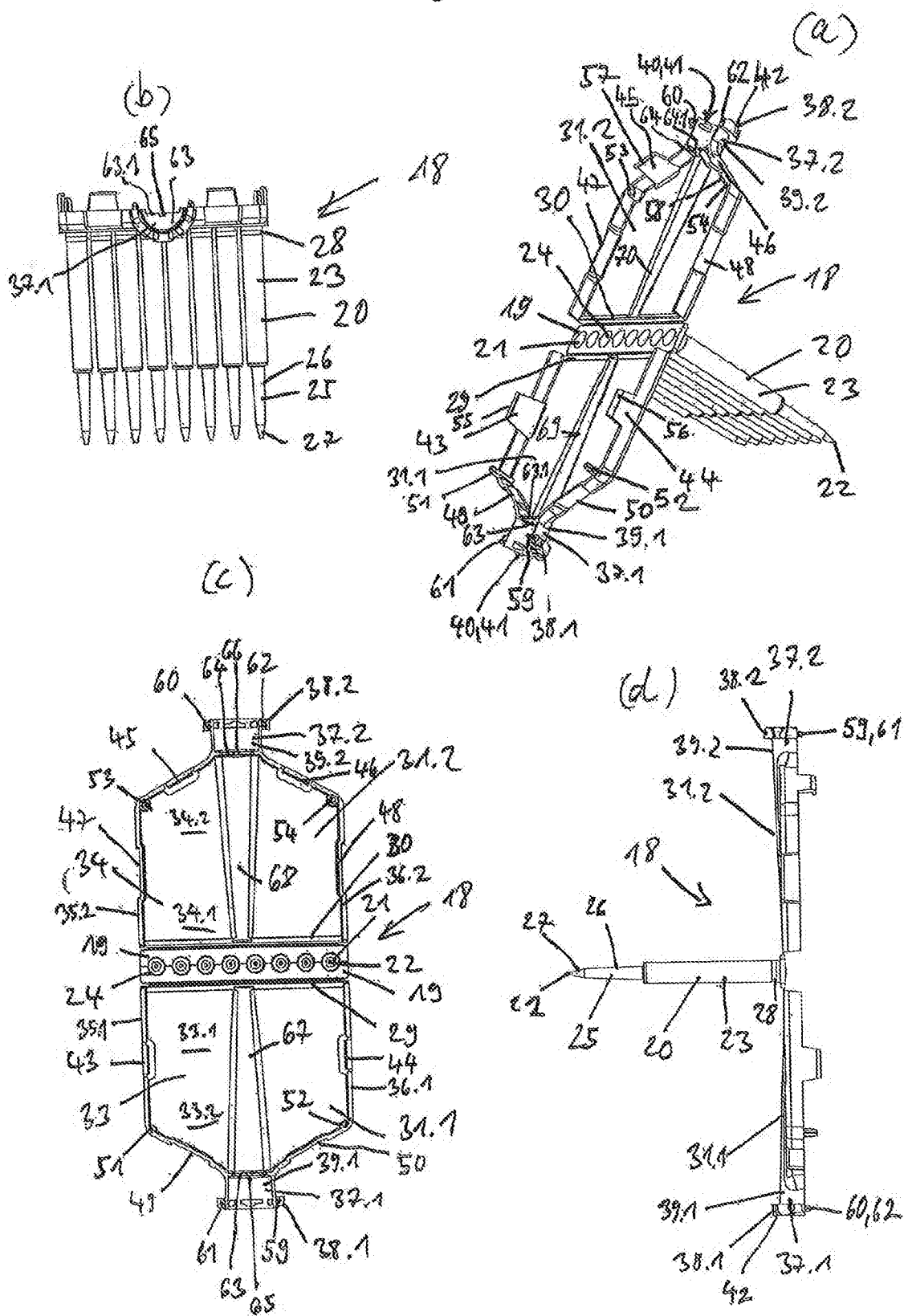
FIG. 2a shows a perspective view obliquely from the front and from the side of a single part barrel unit of the multichannel syringe in an unfolded state.
FIG. 2b shows a front view of a single part barrel unit of the multichannel syringe in an unfolded state.
FIG. 2c shows a plan view of a single part barrel unit of the multichannel syringe in an unfolded state.
FIG. 2d shows a side view of a single part barrel unit of the multichannel syringe in an unfolded state.

According to FIG. 1, the plunger unit 1 has a drive rod 2, a crossmember 3 on the bottom end of the drive rod 2, and a plurality of syringe plungers 4 projecting downward from the crossmember 3 and parallel to the drive rod 2. In the example, the plunger unit 1 comprises eight syringe plungers 4.

The drive rod 2 has a cross profile with ribs 5.1, 5.2, 5.3, 5.4. The drive rod 2 tapers from bottom to top. The ribs 5.1, 5.2 have a trapezoidal cross-section that is constant in the longitudinal direction. The ribs 5.3, 5.4 of the T-profile oriented parallel to the crossmember also have a trapezoidal cross-section. Their height decreases in an upward direction.

A plunger holding apparatus 6 in the form of a circular cylindrical coupling piece is seated at the top end of the drive rod 2. The coupling piece 6 has a plurality of peripheral grooves 7 on the perimeter for being safely gripped by a metering device. According to another embodiment, the coupling piece 6 does not have any peripheral grooves 7.

The crossmember 3 is plate-shaped, has a rectilinear base 8 oriented perpendicular to the drive rod 2, and a first upward tapering with a triangular contour. The two top angled edges each have a bead-like reinforcement 10. A plurality of outwardly projecting ribs 11.1, 11.2 that extend parallel to the syringe plunger 4 run on the front and rear side.

Each syringe plunger 4 has a plunger rod 12 which is connected at the top to the base 8 of the crossmember 3. At the bottom, each plunger rod 12 is connected to a plate-shaped plunger 13. Each plunger has an apron-shaped sealing lip 14 that projects downward. Each sealing lip 14 has a peripheral sealing bead 15 on the outside.

A plunger tip 16 that tapers conically downward projects from the bottom side of each plunger 13.

Each plunger rod 12 has a cross profile with ribs 17.1, 17.2, 17.3, 17.4. The ribs 17.1, 17.2 of the cross profile that are oriented perpendicular to the crossmember 3 continue the ribs 11.1, 11.2 downward on the outside of the crossmember 3.

The plunger unit 1 is injection molded from a single plastic, or from a plurality of plastics in a multi-component injection molding method. Preferably, the plunger unit 1 is injection molded as a single part. Preferably, the plunger unit 1 is injection molded from a polyolefin, preferentially from polyethylene.

According to FIG. 2, a barrel unit 18 comprises a strip-shaped bottom wall 19 and a plurality of syringe barrels 20 that are arranged parallel to each other in a row and project downward from the bottom wall. In the example, the barrel unit 18 comprises eight syringe barrels 20. Each syringe barrel 20 has a top syringe opening 21, and a bottom syringe opening 22. The top syringe opening 21 terminates in the top side of the bottom wall 19. Furthermore, each syringe barrel 20 has a hollow cylindrical, top barrel section 23 with a cylindrical running region 24 for a syringe plunger 4 and a hollow barrel tip 25 that projects from the bottom end of the top barrel section 23. Each barrel tip 25 has two conical sections 26, 27, wherein the top conical section 26 has a lesser conical angle than the bottom conical section 27, and the bottom conical section 27 has the bottom syringe opening 22. Between each top barrel section 23 and the bottom wall 19, there is a short, conical expansion 28 that expands upward.

Housing shells 31.1, 31.2 of a housing 32 are articulated by film hinges 29, 30 to the two opposing longitudinal sides of the bottom wall 19. Each housing shell 31.1, 31.2 has a sidewall 33, 34 that has a substantially rectangular bottom sidewall part 33.1, 34.1 and a substantially gable-shaped top sidewall part 33.2, 34.2. The bottom edge of each sidewall 33, 34 is connected by a film hinge 29, 23 to the bottom wall 19.

Furthermore, each housing shell 31.1, 31.2 has narrow sidewall parts 35.1, 35.2, 36.1, 36.2 or shell edges that stand up on the outer edges of the side walls 33, 34. One-half of a barrel holding apparatus 37 projects in the middle from the top edge of each housing shell 31.1, 31.2. The barrel holding apparatus 37 comprises an annular flange 38 from which a hollow cylindrical retaining pin 39 projects downward. On the top side of the flange 38, code elements 40 and test elements 41 are arranged that are each formed by projections or recesses. The flange 38 has guide structures 42 on the perimeter for aligning with other guide structures of the metering device.

Each housing shell 31.1, 31.2 is connected to one half 37.1, 37.2 of the barrel holding apparatus 37 that is formed by a longitudinal section through the middle axis of the barrel holding apparatus 37.

With regard to the possible configuration of the annular flange 38, reference is made to the annular flange according to EP 2 574 402 B1, U.S. Pat. No. 9,291,529 B2, EP 2 279 791 B1, and U.S. Pat. No. 8,813,584, the content of which is hereby incorporated in this application.

Locking elements 43 to 46 in the form of locking hooks project from the edges of the housing shell 31.1, 31.2. Each housing shell 31.1, 31.2 has two projecting locking hooks 43 to 46 on edges that oppose each other, and the respective other housing shell 31.1, 31.2 has two lateral locking grooves 47 to 50 to receive the locking hooks 43 to 46. One housing shell 31.1 has the locking hooks 43, 44 in the bottom rectangular section, and the locking hooks 49, 50 in the top gable-shaped section, and the other housing shell 31.2 has the locking hooks 45, 46 in the top gable-shaped section and the locking hooks 47, 48 in the bottom rectangular section.

Furthermore, bottom centering pins 51, 52 project from the edge of one housing shell 31.1, and the other housing shell 31.2 has bottom centering holes 53, 54 for receiving the centering pins 51, 52. The bottom centering pins 51, 52 and the bottom centering holes 53, 54 are each located at the corner between the bottom rectangular section 34.1, 33.1 and the top gable-shaped section 34.2, 33.2 of a housing shell 31.1, 31.2.

At the end, each locking hook 43 to 46 has an inwardly projecting locking projection 55 to 58.

Finally, each flange half 38.1, 38.2 of the annular disk-shaped flange 38 has a projecting top centering pin 59, 60 and a top centering hole 61, 62 in the parting plane, wherein the top centering pin 59, 60 of one flange half 38.1, 38.2 is arranged on the side of the top of centering hole 61, 62 of the other flange half 38.1, 38.2, and vice versa.

According to another embodiment, there are no centering holes 53, 54, 61, 62 or centering pins 51, 52, 59, 60, but rather bars that project from a housing shell 31.1, 31.2 and, when the two housing shells 31.1, 31.2 are folded together, lie against the inside of the other housing shell 31.2, 31.1.

At the bottom end of the pin half 39.1, 39.2 of the retaining pin 39, each housing shell 31.1, 31.2 has a projecting bar 63, 64 that partially blocks the cross-section of the pin half 39.1, 39.2. Each bar 63, 64 has an axially oriented slot 65, 66 at the edge in the center of a trough-shaped recess 63.1, 64.1. The ribs 5.3, 5.4 of the drive rod can engage in the recesses 63.1, 64.1 and the ribs 5.1, 5.2 can engage in the slots 65, 66.

The barrel unit 18 is preferably injection-molded as a single part from a single plastic, or from a plurality of plastics in a multi-component injection molding method. Preferentially, the syringe unit is injection-molded from polyolefin, preferably from polypropylene.

According to FIG. 3, the plunger unit 1 is combined with the barrel unit 18 in that the syringe plunger 4 with the plunger tip 16 is aligned with the top syringe openings 21 in the syringe barrels 20. Then, the syringe plungers 4 are inserted into the syringe barrels 20 until the bottom side of the crossmember 3 lies against the top side of the bottom wall 19. In this position, the sealing lips 14 of the syringe plungers 4 do not quite abut the shoulder on the bottom end of the running region 24, and there is still a small gap between the plunger tips 16 and barrel tips 25. This is shown in FIG. 4 (e).

The insertion of the sealing lips 14 into the running regions 24 is facilitated by the expansions 28.

As a continuation of the pen half 39.1, 39.2 of the retaining pin 39, each housing shell 31.1, 31.2 has a barrel discharge 67, 68 that extends nearly up to the film hinge 29, 30, the width and height of which decreases downward. The barrel discharge 67, 68 transitions smoothly at the top into the outer contour of the pin half 39.1, 39.2. On the inside, each housing shell 31.1, 31.2 has an inner longitudinal rib 69, 70 that extends from the bar 63, 64 nearly up to the film the hinge 29, 30. The width and height of the inner longitudinal rib 69, 70, decreases downward.

Then the housing shells 31.1, 31.2 are folded together, wherein the locking hooks 43 to 46 of one housing shell 31.1, 31.2 dip into the locking grooves 47 to 50 of the other housing shell 31.1, 31.2 until the locking projections 55 to 58 extend beyond the edge of the sidewall 33, 34 of the other housing shell 31.1, 31.2. Furthermore while folding together, the centering pins 51, 52, 59, 60 of one housing shell 31.1, 31.2 are each inserted into a centering hole 53, 54, 61, 62 of the other housing shell 31.1, 31.2. When joined, the narrow sidewall parts 35.1, 35.2 form a narrow sidewall 35, and when joined, the narrow sidewall parts 36.1, 36.2 form a narrow sidewall 36 of the housing 32.

FIG. 4 shows the multichannel syringe 72 that is fully assembled by locking the housing shells 31.1, 31.2 to form a housing 32 for the syringe barrels. The multichannel syringe 72 comprises eight syringes 73 in the example.

The housing 32 is simultaneously a support 71 for the barrel unit 18 from which the syringe barrels 20 project downward.

Preferably the multichannel syringe 72 is a disposable part.

According to FIG. 5, the multichannel syringe 72 is held on the bottom end of a metering device 74. The metering device 74 is a dispenser with an electric motor drive for the syringe plungers 4 in the example. It is a handheld dispenser, i.e., it is a dispenser that can be held in one hand by the user when metering. The Multipette® E3 electronic dispenser by Eppendorf AG is shown in the drawing.

The metering device 74 has a substantially rod-shaped apparatus housing 75.

On the bottom end, the apparatus housing 75 has a seat 76 in which a conventional syringe or a multichannel syringe 72 according to the invention with the annular flange 38 can be alternatively inserted. The annular flange 38 is fixed in the seat 76 on an annular stop 77 by means of syringe gripping levers 78, 79.

Furthermore, an axially movable plunger seat 80 is in the seat 76 in which a single syringe, or the multichannel syringe 72 according to the invention, can be inserted with the coupling piece 6.

While being inserted into the plunger seat 80, the coupling piece 6 is gripped by plunger gripping levers 81, 82.

Details of potential holding mechanisms of the metering device are described in EP 0 656 229 B1, U.S. Pat. No. 5,620,660A, EP 2 279 791 B1 and U.S. Pat. No. 8,813,584 B2, the content of which is hereby incorporated in this application.

At the top, the metering device 74 has a dial 83 for selecting the operating mode which, inter alia, allows the operating modes of dispensing and pipetting to be selected.

Furthermore, the metering device 74 has a large display 84 at the top that in particular indicates the set metered volumes.

Underneath, the metering device 74 has two rocker switches 85, 86 for adjusting various metering parameters.

A trigger button 87 serves to trigger drawing and dispensing or pipetting steps, as well as to save parameter settings to memory.

On the rear, the metering device 74 has a handrest 88 for securely and comfortably holding the metering device 74.

An ejector 89 with an ejector button 90 on the top end enables single-handed ejection of single syringes, as well as the multichannel syringe 72 according to the invention.

The forces to be applied for attaching the multichannel syringe 72 and releasing the multichannel syringe 72 from the metering device 74 correspond to the forces for attaching and releasing a single syringe. When suitably programmed with the assistance of the code of the multichannel syringe 72, the metering device 74 can recognize the type of inserted multichannel syringe 72 and correspondingly control the display 84.

Due to the low weight of the multichannel syringe 72, the metering device 74 can be handled very easily, even with the multichannel syringe 72 attached thereto.

According to FIG. 6, the multichannel syringe 72 is held on the bottom end of a metering device 91 which is a manually driven dispenser. It is also a handheld dispenser that can be held in one hand by the user when metering. The example shows the Multipette® M4 manual dispenser by Eppendorf AG.

The metering device 91 has a substantially rod-shaped instrument housing 92. On the bottom end, the latter has a seat 93 in which a conventional syringe or a multichannel syringe 72 according to the invention with the annular flange 38 can be alternatively inserted. The annular flange 38 is fixed in the seat 92 on an annular stop by means of syringe gripping levers.

Furthermore, an axially movable plunger seat is in the seat 92 in which a single syringe, or the multichannel syringe 72 according to the invention, can be inserted with the coupling piece 6.

While being inserted into the plunger seat, the coupling piece 6 is gripped by plunger gripping levers.

Details of possible holding mechanisms of the metering device are described in the patent publications that are listed with regard to the metering device according to FIG. 5.

The metering device 91 has a drawing lever 94 and a dispensing lever 95 on the front side of the housing 92. At the top end of the housing 92, there is a dial 96 that projects slightly out of the housing 92 on both sides and with which the dispensing increment and are thus the dispensing volume can be adjusted.

Furthermore, the housing 92 has a display 97 on the top end on the same side where the drawing lever 94 and dispensing lever 95 are located. Depending on the code of the inserted syringe, or respectively multichannel syringe 72, the display 97 shows the metered amount of each metering step for each setting of the dial 96.

Liquid is drawn into all of the syringes (channels) of the multichannel syringe 72 by means of the drawing lever 94. By actuating the dispensing lever 95, liquid is discharged stepwise until there is no more liquid in the syringes, or respectively the residual amount in the syringes is insufficient for the set metering amount.

According to FIG. 6, on the outside in the transitional region between the running region 24 and the barrel tip 25, the multichannel syringe 72 also has centering ribs 25.1 that taper downward in order to center the centering units while being introduced into deep sample wells.

This application has the advantages noted with regard to FIG. 5. In particular, the low weight of the multichannel syringe 72 is advantageous.

Finally, FIG. 7 shows the use of a multichannel syringe 72 in a laboratory machine 98. The latter has a working plate 99 above which a metering device 101 that is driven by an electric motor can be moved by means of an XYZ transfer system 100 driven by an electric motor.

The metering device 101 has a rod-shaped instrument housing 102 with a box cross-section that has a seat 103 at the bottom end for a conventional syringe or a multichannel syringe 72 according to the invention. The annular flange 38 is fixed in the seat on an annular stop by means of syringe gripping levers.

In the seat 103, a plunger seat is movably arranged that is driven by an electric motor drive. A single syringe or a multichannel syringe 72 according to the invention with the coupling piece 6 can be inserted into the plunger seat. While being inserted into the plunger seat, the coupling piece 6 is gripped by plunger gripping levers.

Details of possible holding mechanisms of the metering device 101 are also described in the patent publications above that are listed with regard to the metering device 74 according to FIG. 5.

For example, a container 104 for reagents, a microtiter plate 105 with recesses 106 in the top side for receiving liquid, and a container 107 for providing or discharging multichannel syringes 72 are on the working plate 99. By means of the XYZ transfer system 100, the metering device 101 can be moved until it can pick up and discharge multichannel syringes 72 on the working plate 99, and can draw liquid into the picked up multichannel syringes 72 and discharge liquid to microtiter plates 106 or other containers 104.

In this application, in particular the low weight and the low attachment and ejection forces are advantageous.

Figure 8A:
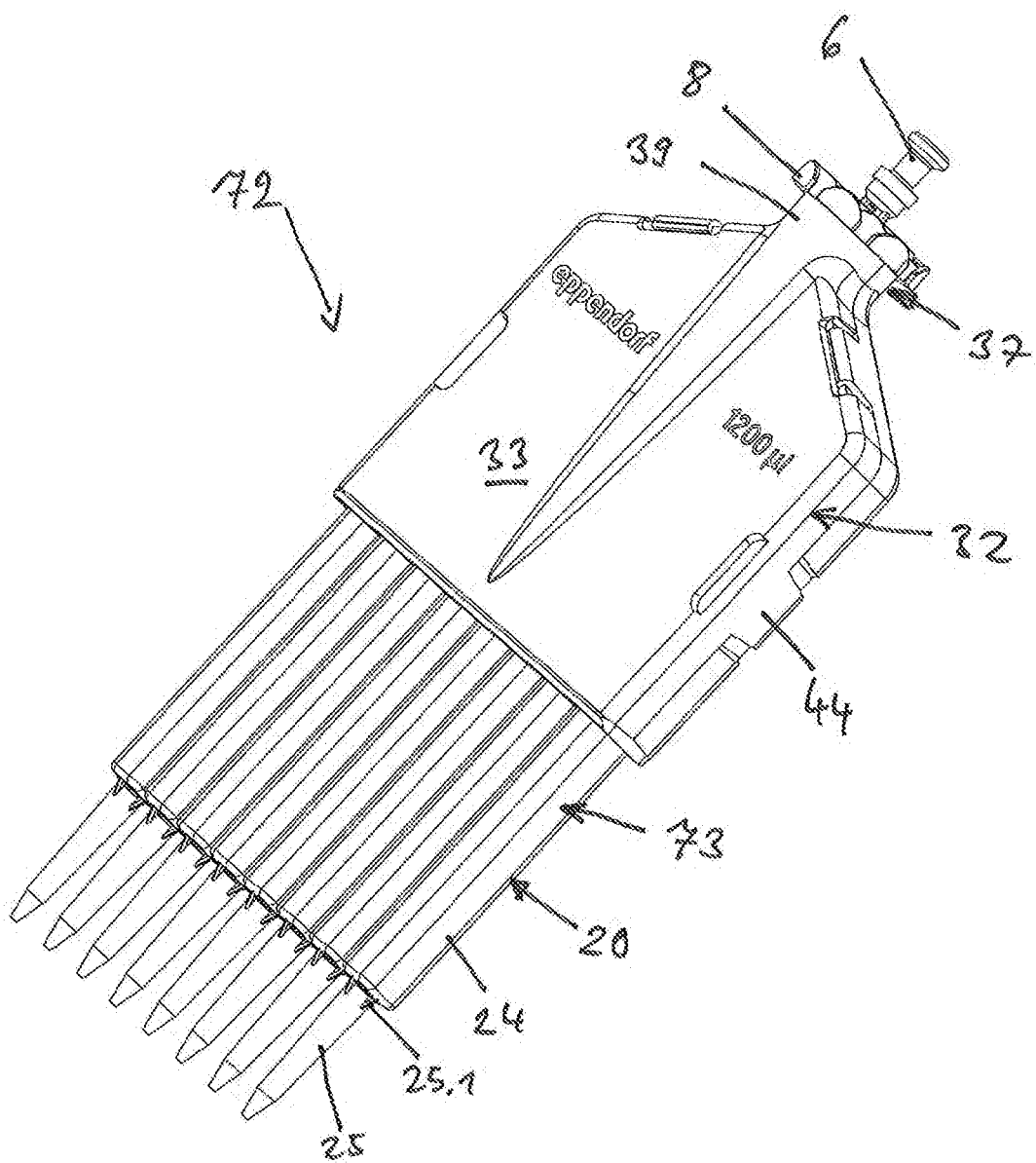
FIG. 8a shows a perspective view obliquely from the front and from the side of another multichannel syringe with barrel units with a rectangular cross-section.

In contrast to the above-described multichannel syringe, the multichannel syringe in FIG. 8 has barrel units 18 with a rectangular instead of a circular cross-section.

Figure 9A:
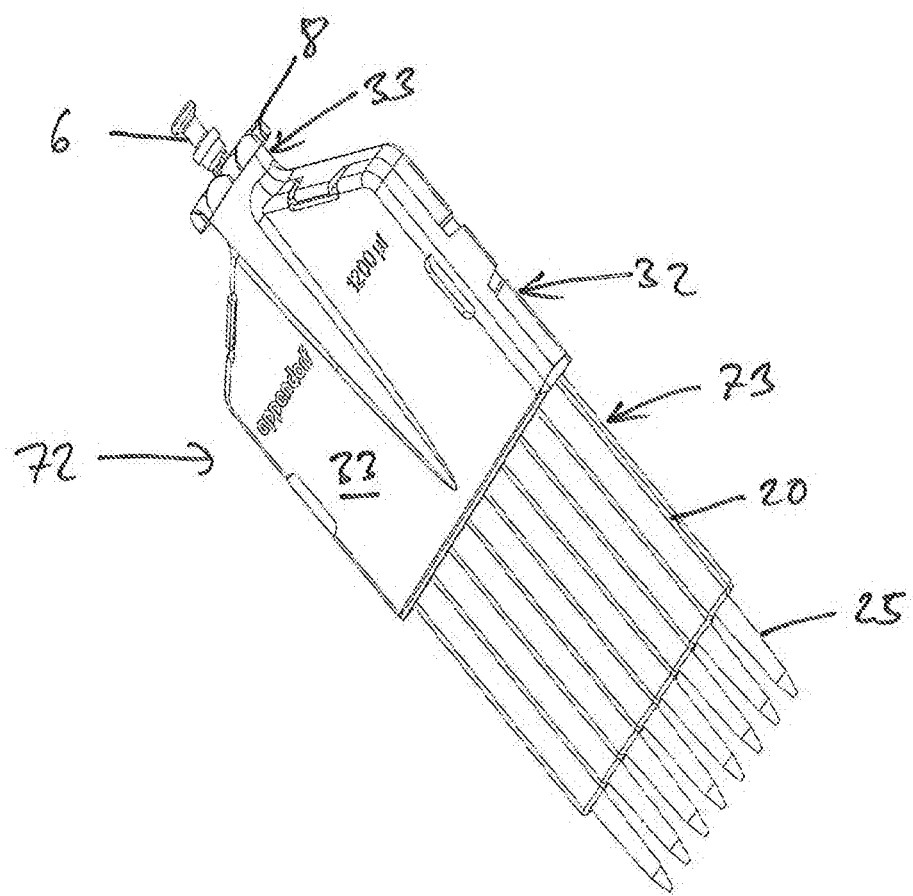
FIG. 9a shows a perspective view obliquely from the front and from the side of another multichannel syringe with barrel units with an oval cross-section.

The multichannel syringe according to FIG. 9 has barrel units 18 with an oval cross-section.

In the exemplary embodiments in FIGS. 8 and 9, barrel units 18 with a larger cross-section can be arranged on the bottom wall than is the case with multichannel syringes according to FIGS. 1 to 7.

The statements regarding the channels syringe in FIGS. 1 to 7 apply analogously to the multichannel syringes of FIGS. 8 and 9. The corresponding components of the multichannel syringes of FIGS. 8 and 9 are provided with the same reference numbers as the multichannel syringe of FIGS. 1 to 7.

REFERENCE SIGN LIST

1 Plunger unit
2 Drive rod
3 Crossmember
4 Syringe plunger
5.1, 5.2 5.3, 5.4 Ribs
6 Plunger holding apparatus
7 Grooves
8 Base
9 Tapering
10 Reinforcement
11.1, 11.2 Ribs
12 Plunger rod
13 Plunger
14 Sealing lip
15 Sealing bead
16 Plunger tip
17.1, 17.2, 17.3, 17.4 Ribs
18 Barrel unit
19 Bottom wall
20 Syringe barrel
21 Top syringe opening
22 Bottom syringe opening
23 Barrel section
24 Running region
25 Barrel tip
25.1 Centering rib
26, 27 Conical sections
28 Expansion
29, 30 Film hinge
31.1, 31.2 Housing shell
32 Housing
33, 34 sidewall
33.1, 34.1 Bottom sidewall part 33.2, 34.2 Top sidewall part
35, 36 Narrow sidewall part
37 Barrel holding apparatus
37.1, 37.2 Half of the barrel holding apparatus
38 Flange
38.1, 38.2 Flange half
39 Hollow cylindrical retaining pin
39.1, 39.2 Pin half
40 Code element
41 Test element
42 Guide structure
43, 44, 45, 46 Locking hook
47, 48, 49, 50 Locking groove
51, 52 Bottom centering pin
53, 54 Bottom centering hole
55, 56, 57 58 Locking projection
59, 60 Top centering pin
61, 62 Top centering hole
63,64 Bar
63.1, 64.1 Trough-shaped recess
65, 66 Slot
67, 68 Barrel discharge
69, 70 Inner longitudinal rib
71 Support
72 Multichannel syringe
73 Syringe
74 Metering device
75 Instrument housing
76 Seat
77 Annular stop
78, 79 Syringe gripping lever
80 Plunger seat
81, 82 Plunger gripping lever
83 Dial
84 Display
85, 86 Rocker switch
87 Trigger button
88 Handrest
89 Ejector
90 Ejector button
91 Metering device
92 Instrument housing
93 Seat
94 Drawing lever
95 Dispensing lever
96 Selection wheel
97 Display
98 Laboratory machine
99 Working plate
100 XYZ transfer system
101 Metering device
102 Instrument housing
103 Seat
104 Container
105 Microtiter plate
106 Recess
107 Container

The invention claimed is:

1. A multichannel syringe for use with a metering device for metering liquids in a laboratory with a first holding apparatus for a barrel holding apparatus of a syringe barrel and an axially movable second holding apparatus for a plunger holding apparatus of a syringe plunger comprising:
a single-part plunger unit made of plastic that has a drive rod with the plunger holding apparatus on the upper end, a crossmember which is oriented perpendicularly to the drive rod on the lower end of the drive rod, a plurality of syringe plungers projecting downward from the crossmember and parallel to the drive rod, and a peripheral sealing region on each syringe plunger,
a single-part barrel unit made of plastic comprising a support and at least one row of syringe barrels which are arranged adjacently in a parallel manner, which protrude downwards from the support, each of which has a lower syringe opening, an upper syringe opening, and a running region in the interior for one syringe plunger of the plunger unit,
wherein each syringe plunger engages into a syringe barrel through an upper syringe opening and is sealingly movable in the running region with the sealing region sealingly lying against the running region, and
the barrel holding apparatus is arranged above the syringe barrels and is connected to the support, wherein the support comprises a bottom wall of a housing that is formed integrally with the syringe barrels, and the housing has sidewalls that project from the bottom wall upward and are connected to the barrel holding apparatus, and further wherein the housing has bars that project on the inside and are slotted in an axial direction and into which ribs of the drive rod engage.

2. A multichannel syringe for use with a metering device for metering liquids in a laboratory with a first holding apparatus for a barrel holding apparatus of a syringe barrel and an axially movable second holding apparatus for a plunger holding apparatus of a syringe plunger comprising:
a single-part plunger unit made of plastic that has a drive rod with the plunger holding apparatus on the upper end, a crossmember which is oriented perpendicularly to the drive rod on the lower end of the drive rod, a plurality of syringe plungers projecting downward from the crossmember and parallel to the drive rod, and a peripheral sealing region on each syringe plunger,
a single-part barrel unit made of plastic comprising a support and at least one row of syringe barrels which are arranged adjacently in a parallel manner, which protrude downwards from the support, each of which has a lower syringe opening, an upper syringe opening, and a running region in the interior for one syringe plunger of the plunger unit,
wherein each syringe plunger engages into a syringe barrel through an upper syringe opening and is sealingly movable in the running region with the sealing region sealingly lying against the running region, and
the barrel holding apparatus is arranged above the syringe barrels and is connected to the support, wherein the support comprises a bottom wall of a housing that is formed integrally with the syringe barrels, and the housing has sidewalls that project from the bottom wall upward and are connected to the barrel holding apparatus, and further wherein the bottom wall is connected integrally by means of film hinges to the sidewalls on two longitudinal sides that oppose each other, at least one of the sidewalls is connected at the top to the barrel holding apparatus, the sidewalls are folded at the film hinges, and the sidewalls are connected to each other.

3. The multichannel syringe according to claim 2, wherein the sidewalls having narrow sidewall parts that project from side edges, wherein at least two sidewall parts when in a folded position jointly form a narrow sidewall.

4. The multichannel syringe according to claim 2, wherein the barrel holding apparatus has two halves, wherein each half is connected to one sidewall of the housing, and the two halves lie against each other on edges that are diametrically opposed to each other.

5. The multichannel syringe according to claim 2, wherein the sidewalls of the barrel holding apparatus are connected to each other and/or aligned with each other by locking elements, and/or by hot caulking, and/or by welding, and/or by adhesive bonding, and/or by centering elements.

6. A multichannel syringe for use with a metering device for metering liquids in a laboratory with a first holding apparatus for a barrel holding apparatus of a syringe barrel and an axially movable second holding apparatus for a plunger holding apparatus of a syringe plunger comprising:
a single-part plunger unit made of plastic that has a drive rod with the plunger holding apparatus on the upper end, a crossmember which is oriented perpendicularly to the drive rod on the lower end of the drive rod, a plurality of syringe plungers projecting downward from the crossmember and parallel to the drive rod, and a peripheral sealing region on each syringe plunger,
a single-part barrel unit made of plastic comprising a support and at least one row of syringe barrels which are arranged adjacently in a parallel manner, which protrude downwards from the support, each of which has a lower syringe opening, an upper syringe opening, and a running region in the interior for one syringe plunger of the plunger unit,
wherein each syringe plunger engages into a syringe barrel through an upper syringe opening and is sealingly movable in the running region with the sealing region sealingly lying against the running region, and the barrel holding apparatus is arranged above the syringe barrels and is connected to the support, wherein the barrel holding apparatus has a code on the top edge.

7. A multichannel syringe for use with a metering device for metering liquids in a laboratory with a first holding apparatus for a barrel holding apparatus of a syringe barrel and an axially movable second holding apparatus for a plunger holding apparatus of a syringe plunger comprising:
a single-part plunger unit made of plastic that has a drive rod with the plunger holding apparatus on the upper end, a crossmember which is oriented perpendicularly to the drive rod on the lower end of the drive rod, a plurality of syringe plungers projecting downward from the crossmember and parallel to the drive rod, and a peripheral sealing region on each syringe plunger,
a single-part barrel unit made of plastic comprising a support and at least one row of syringe barrels which are arranged adjacently in a parallel manner, which protrude downwards from the support, each of which has a lower syringe opening, an upper syringe opening, and a running region in the interior for one syringe plunger of the plunger unit,
wherein each syringe plunger engages into a syringe barrel through an upper syringe opening and is sealingly movable in the running region with the sealing region sealingly lying against the running region, and the barrel holding apparatus is arranged above the syringe barrels and is connected to the support, wherein the barrel holding apparatus has an annular disc-shaped flange, and the drive rod is arranged on a middle axis of the annular disc-shaped flange.

8. The multichannel syringe according to claim 7, wherein the barrel holding apparatus has a hollow cylindrical retaining pin, the drive rod is arranged on a middle axis of the retaining pin, and the flange is connected to a top end of the retaining pin.

9. A multichannel syringe for use with a metering device for metering liquids in a laboratory with a first holding apparatus for a barrel holding apparatus of a syringe barrel and an axially movable second holding apparatus for a plunger holding apparatus of a syringe plunger comprising:
a single-part plunger unit made of plastic that has a drive rod with the plunger holding apparatus on the upper end, a crossmember which is oriented perpendicularly to the drive rod on the lower end of the drive rod, a plurality of syringe plungers projecting downward from the crossmember and parallel to the drive rod, and a peripheral sealing region on each syringe plunger,
a single-part barrel unit made of plastic comprising a support and at least one row of syringe barrels which are arranged adjacently in a parallel manner, which protrude downwards from the support, each of which has a lower syringe opening, an upper syringe opening, and a running region in the interior for one syringe plunger of the plunger unit,
wherein each syringe plunger engages into a syringe barrel through an upper syringe opening and is sealingly movable in the running region with the sealing region sealingly lying against the running region, and the barrel holding apparatus is arranged above the syringe barrels and is connected to the support, wherein the crossmember is plate-shaped, has a rectilinear base oriented perpendicular to the drive rod from which each of the syringe plungers projects downwardly therefrom, and has a first upward tapering at a top, wherein the drive rod projects upward from a top end of the crossmember.

10. The multichannel syringe according to claim 9, wherein each syringe plunger has a plunger rod that is connected at a top to the crossmember and at a bottom to a plunger which is sealingly guided in the running region.

11. The multichannel syringe according to claim 9, wherein each syringe plunger has a plunger tip on a bottom end, and each syringe barrel has a barrel tip on a bottom barrel tip end into which the plunger tip can be inserted.

12. The multichannel syringe according to claim 9, wherein the crossmember, and/or the drive rod, and/or the plunger rods have ribs which project outward and extend parallel to the syringe plunger.

13. The multichannel syringe according to claim 9, wherein the support comprises a bottom wall of a housing that is formed integrally with the syringe barrels, and the housing has sidewalls that project from the bottom wall upward and are connected to the barrel holding apparatus.

14. The multichannel syringe according to claim 13, wherein the housing has a tapering at the top.

15. The multichannel syringe according to claim 9, wherein the support is connected integrally to the barrel holding apparatus.

16. The multichannel syringe according to claim 9, wherein the plunger unit is injection molded as a single part, and/or the barrel unit, and/or a housing, and/or the barrel holding apparatus are injection molded as a single part.

17. A multichannel syringe according to claim 9, in combination with a metering device for metering liquids in a laboratory with a first holding apparatus for a barrel holding apparatus of a syringe barrel and an axially movable second holding apparatus for a plunger holding apparatus of a syringe plunger.

18. The multichannel syringe in combination with a metering device according to claim 17, wherein the metering device is a portable or stationary metering device that is manually driven or driven by an electric motor.

* * * * *